(12) United States Patent
Pearl, Jr. et al.

(10) Patent No.: US 11,549,323 B2
(45) Date of Patent: Jan. 10, 2023

(54) SYSTEMS AND METHODS FOR BONDING A DOWNHOLE TOOL TO A BOREHOLE TUBULAR

(71) Applicant: Halliburton Energy Services, Inc., Houston, TX (US)

(72) Inventors: William Cecil Pearl, Jr., Spring, TX (US); Sam Lewis, Spring, TX (US); Lonnie Helms, Humble, TX (US); Frank Acosta, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 149 days.

(21) Appl. No.: 16/879,729

(22) Filed: May 20, 2020

(65) Prior Publication Data

US 2021/0363841 A1    Nov. 25, 2021

(51) Int. Cl.
| | | |
|---|---|---|
| *E21B 23/01* | (2006.01) | |
| *E21B 17/10* | (2006.01) | |
| *B23K 1/00* | (2006.01) | |
| *B23K 3/06* | (2006.01) | |

(52) U.S. Cl.
CPC .......... *E21B 23/01* (2013.01); *E21B 17/1078* (2013.01); *B23K 1/0008* (2013.01); *B23K 3/0607* (2013.01)

(58) Field of Classification Search
CPC .......... E21B 23/01; E21B 19/16; E21B 34/06; E21B 17/10; E21B 17/20; E21B 23/08; B23K 1/0008; B23K 3/0607
See application file for complete search history.

(56) References Cited

U.S. PATENT DOCUMENTS

| | | | |
|---|---|---|---|
| 2,083,976 | A | 6/1937 | Armstrong |
| 4,658,896 | A | 4/1987 | Milam |
| 5,244,143 | A * | 9/1993 | Ference ............... B23K 3/0607 |
| | | | 228/56.3 |
| 6,955,216 | B1 | 10/2005 | Heijnen et al. |
| 10,233,717 | B2 | 3/2019 | Hered |
| 2006/0086503 | A1 | 4/2006 | Reddy et al. |
| 2006/0144591 | A1 | 7/2006 | Gonzalez et al. |
| 2006/0185856 | A1 | 8/2006 | Steele |
| 2007/0284037 | A1 | 12/2007 | Buytaert |

(Continued)

FOREIGN PATENT DOCUMENTS

WO    2017011029 A1    1/2017

OTHER PUBLICATIONS

Cinar et al., Mechanical Fracturing of Core-Shell Undercooled Metal Particles for Heat-Free Soldering, Scientific Reports 6, Article No. 21864 (2016) doi:10.1038/srep21864.

(Continued)

*Primary Examiner* — Yong-Suk (Philip) Ro
(74) *Attorney, Agent, or Firm* — K&L Gates LLP (57) ABSTRACT

The present disclosure provides methods for bonding a first downhole tool to a borehole tubular, which include applying solder particles, each particle having an outer shell and a core of liquid metal, to at least one of a surface of the first downhole tool or a surface of the borehole tubular. The methods may also include rupturing the shells of the solder particles to release the liquid metal cores. The methods may further include bonding the first downhole tool to the borehole tubular by allowing the released liquid metal core to solidify.

20 Claims, 5 Drawing Sheets

(56) References Cited

U.S. PATENT DOCUMENTS

| | | |
|---|---|---|
| 2011/0094742 A1 | 4/2011 | Badalamenti |
| 2012/0211283 A1 | 8/2012 | Digiovanni |
| 2012/0255742 A1 | 10/2012 | Cortez |
| 2013/0133876 A1 | 5/2013 | Naedler |
| 2013/0206425 A1 | 8/2013 | Mazyar et al. |
| 2015/0021047 A1 | 1/2015 | Buytaert et al. |
| 2015/0198009 A1 | 7/2015 | Bexte et al. |
| 2015/0315868 A1 | 11/2015 | Fripp |
| 2017/0014958 A1 | 1/2017 | Thou et al. |
| 2017/0183937 A1 | 6/2017 | Harper |
| 2017/0370186 A1 | 12/2017 | Stair |
| 2018/0252091 A1 | 9/2018 | Bustos |
| 2019/0003282 A1 | 1/2019 | Doherty |
| 2019/0277109 A1 | 9/2019 | Bowersock |
| 2020/0362675 A1 | 11/2020 | Anderson et al. |

OTHER PUBLICATIONS

International Search Report and the Written Opinion of the International Search Authority dated Feb. 3, 2021 for PCT Application No. PCT/US2020/035100 filed May 29, 2020.

International Search Report and the Written Opinion of the International Search Authority dated Feb. 18, 2021 for PCT Application No. PCT/US2020/035106 filed May 29, 2020.

International Search Report and the Written Opinion of the International Search Authority dated Jan. 22, 2021 for PCT Application No. PCT/US2020/031277 filed May 29, 2020.

\* cited by examiner

SYSTEMS AND METHODS FOR BONDING A DOWNHOLE TOOL TO A BOREHOLE TUBULAR

BACKGROUND

This section is intended to provide relevant background information to facilitate a better understanding of the various aspects of the described embodiments. Accordingly, it should be understood that these statements are to be read in this light and not as admissions of prior art.

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a borehole at a desired well site, treating the borehole to optimize production of hydrocarbons, and performing the necessary steps to produce and process the hydrocarbons from the subterranean formation.

Some borehole servicing methods employ borehole tubulars that are lowered into the borehole for various purposes throughout the life of the borehole. Centralizers are used to maintain the borehole tubulars aligned within the borehole and decrease any friction between the borehole tubular and the side of the borehole wall or casing, potentially reducing any damage that may occur. Centralizers are generally added onto the tubular section prior to the tubular section arriving at the wellsite.

Tubulars can also have additional downhole tools, such as fiber optic lines, control lines, and/or sensors, attached to the exterior of the tubular. The downhole tools may be attached to the tubular using straps or similar methods prior to the tubular going downhole. However, the straps may be overtightened, causing damage to the downhole tools, or become loose as the tubular is installed and shift the locations of the downhole tools.

BRIEF DESCRIPTION OF THE DRAWINGS

Embodiments of the downhole are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes systems and method for bonding at least one downhole tool to a borehole tubular. These systems and methods allow the downhole tools to be bonded to the tubular at the wellsite, reducing the cost and the manufacturing time typically associated with a downhole tool that is attached to a tubular.

A borehole may in some instances be formed in a substantially vertical orientation relative to the earth's surface, and a lateral borehole may in some instances be formed in a substantially horizontal orientation relative to the earth's surface. However, the orientation of each of these boreholes may include portions that are vertical, non-vertical, horizontal, or non-horizontal. Further, the term "uphole" refers a direction that is towards the earth's surface, while the term "downhole" refers a direction that is further into the earth's surface.

Figure 1:
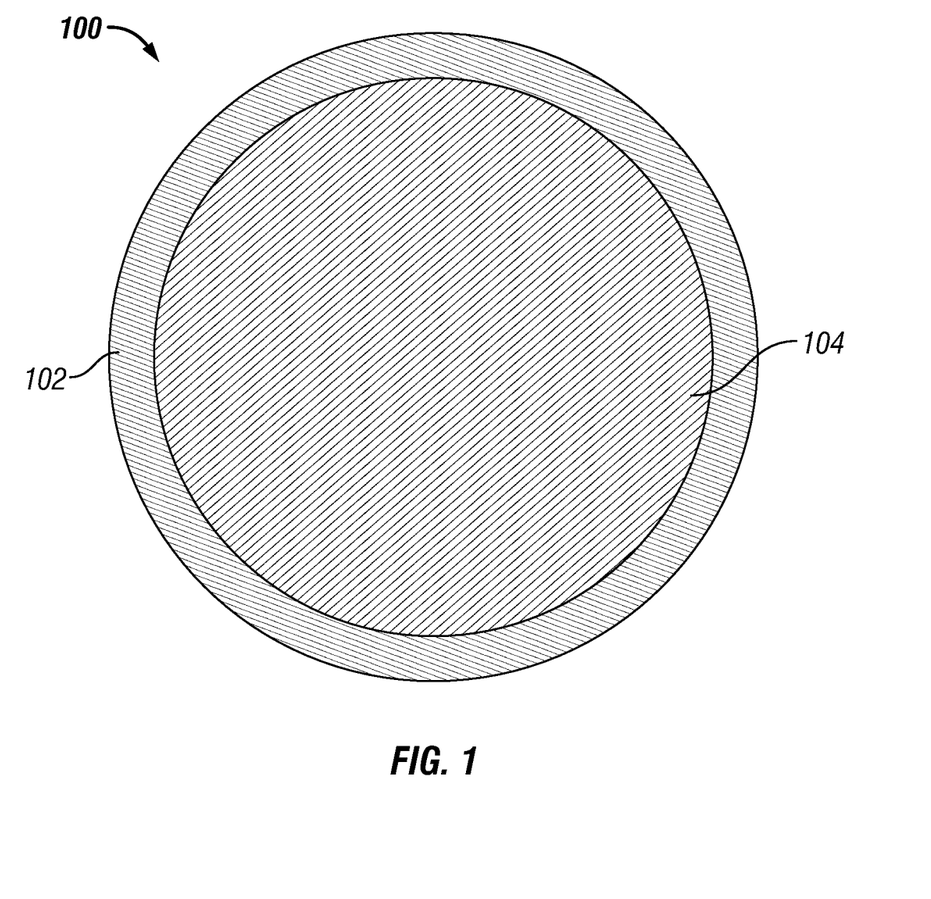
FIG. 1 is a cross-sectional view of a solder particle, according to one or more embodiments.

FIG. 1 is a cross-sectional view of a solder particle 100, according to one or more embodiments. To form the solder particle, a metal alloy is melted to form a liquid. The liquid eutectic metal is then combined with an acid-containing carrier fluid and a rotating implement is used to shear the liquid metal to form nanoparticles and/or microparticles of the liquid eutectic metal.

After the nanoparticles and microparticles have formed, a chemical reaction occurs that results in the oxidation of an outer layer of the liquid eutectic metal. The oxidation of the outer layer forms a rupturable solid outer shell 102 that surrounds a liquid eutectic metal core 104. Once the solder particle is formed, the core 104 remains a liquid at ambient conditions until the outer shell 102 is ruptured via mechanical stress, such as an impact or increase in pressure, or chemical etching of the outer shell 102 by an acid. The solder particle 100 can be suspended in a medium, such as, but not limited to, water-based liquids, oil-based liquids, or ethanol-based liquids, to form a solder suspension that can be applied to a surface as a coating.

When the outer shell is ruptured, the liquid metal in the core 104 is released and the liquid metal is exposed to the ambient environmental conditions, the oxide fragments that made up the shell, and/or any surfaces the solder particle was in contact with. This exposure causes the liquid metal to solidify and the solidified cores bond adjacent surfaces in contact with the solder particles 100.

Figure 2:
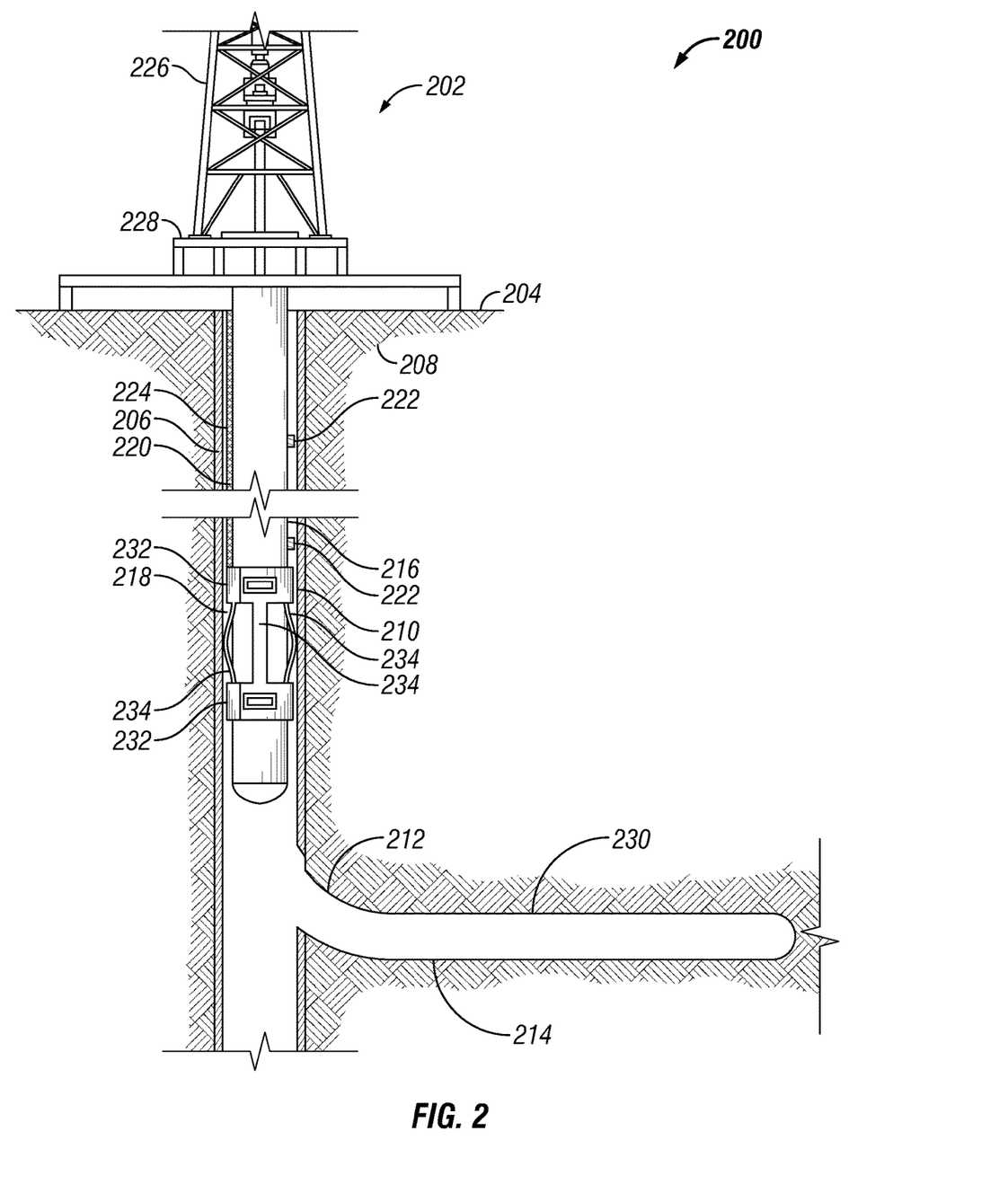
FIG. 2 is a diagram of a well system, according to one or more embodiments.

Turning now to FIG. 2, FIG. 2 is a diagram of a well system 200, according to one or more embodiments. As depicted, the well system 200 comprises a drilling rig 202 that is positioned on the earth's surface 204 and extends over and around a borehole 206 that penetrates a subterranean formation 208 for the purpose of recovering hydrocarbons. The borehole 206 may be drilled into the subterranean formation 208 using any suitable drilling technique. The borehole 206 extends substantially vertically into from the earth's surface 204 over a vertical borehole portion 210, deviates from vertical relative to the earth's surface 204 over a deviated borehole portion 212, and transitions to a horizontal borehole portion 214. In alternative well systems, all or portions of a borehole may be vertical, deviated at any suitable angle, horizontal, and/or curved. The borehole 206 may be a new borehole, an existing borehole, a straight borehole, an extended reach borehole, a sidetracked borehole, a multi-lateral borehole, and other types of boreholes for drilling and completing one or more production zones. Further, the borehole 206 may be used for both producing wells and injection wells. The borehole 206 may also be used for purposes other than or in addition to hydrocarbon production, such as uses related to geothermal energy.

A borehole tubular 216 may be lowered into the borehole 206 for a variety of drilling, completion, workover, or treatment procedures throughout the life of the borehole. Attached to the borehole tubular 216 are one or more downhole tools, such as a centralizer 218, a fiber optic cable 220, and/or sensors 222. The sensors 222 may be axially spaced on the borehole tubular 216, radially spaced on the borehole tubular 216, or both axially and radially spaced on the borehole tubular 216. The embodiment shown in FIG. 2 illustrates the borehole tubular 216 being lowered into the subterranean formation. As shown in FIG. 2, the borehole tubular 216 is a casing string. However, it should be understood that the centralizer 218, fiber optic cable 220, and/or sensors 222 are equally applicable to any type of borehole tubular being inserted into a borehole, including as non-limiting examples liners, drill pipe, production tubing, rod strings, and coiled tubing. The centralizer 218 may also be used to centralize various subs and workover tools. In the embodiment shown in FIG. 2, the borehole tubular 216 comprising the centralizer 218, fiber optic cable 220, and sensors 222 is conveyed into the borehole 206 in a conventional manner and may subsequently be secured within the borehole 206 by filling an annulus 224 between the borehole tubular 216 and the borehole 206 with cement. It should also be appreciated that the borehole tubular 216 need not include each of the centralizer 218, a fiber optic cable 220, and/or sensors 222 and may only include or any combination of these downhole tools.

The drilling rig 202 comprises a derrick 226 with a rig floor 228 through which the borehole tubular 216 extends downward from the drilling rig 202 into the borehole 206. The drilling rig 202 comprises a motor driven winch and other associated equipment for extending the borehole tubular 216 into the borehole 206 to position the borehole tubular 216 at a selected depth. While the well system 200 depicted in FIG. 2 refers to a stationary drilling rig 202 for lowering and setting the borehole tubular 216 within a land-based borehole 206, in alternative embodiments, mobile workover rigs, borehole servicing units (such as coiled tubing units), and the like may be used to lower the borehole tubular 216 into a borehole. It should be understood that a borehole tubular 216 may alternatively be used in other operational environments, such as within an offshore borehole operational environment.

In alternative well systems, a vertical, deviated, or horizontal borehole portion may be cased and cemented and/or portions of the borehole may be uncased. For example, uncased section 230 may comprise a section of the borehole 206 ready for being cased with borehole tubular 216. In an embodiment, a portion of the borehole 206 may comprise an underreamed section. As used herein, underreaming refers to the enlargement of an existing borehole below an existing section, which may be cased in some embodiments. An underreamed section may have a larger diameter than a section upward from the underreamed section. Thus, a borehole tubular passing down through the borehole may pass through a smaller diameter passage followed by a larger diameter passage.

Figure 3:
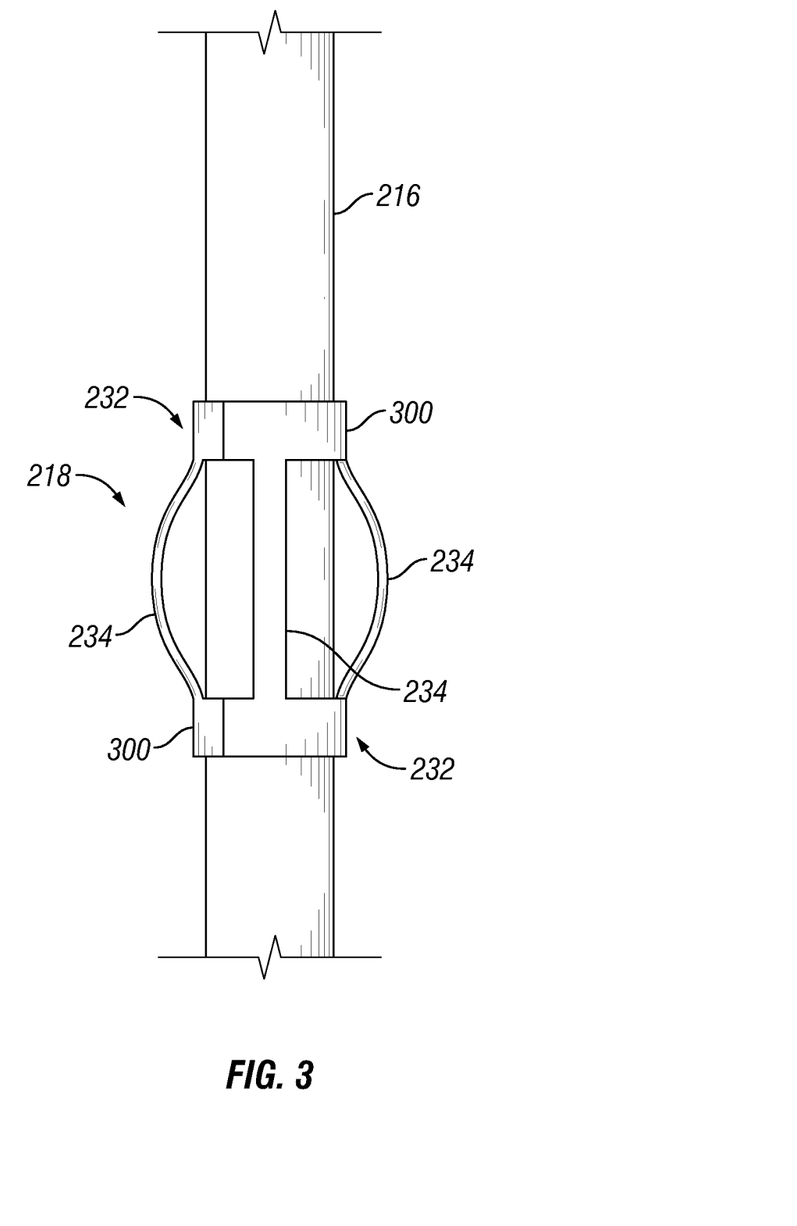
FIG. 3 is a side view of the centralizer of FIG. 2.

Turning now to FIG. 3, FIG. 3 is a side view of the centralizer 218 of FIG. 2. Regardless of the type of operational environment the centralizer 218 is used, it will be appreciated that the centralizer 218 serves to aid in guiding and placing the borehole tubular 216 through the borehole 206. The centralizer 218 comprises collars 232 and a plurality of bow springs 234 connecting the collars 232. The centralizer 218 centers the borehole tubular 216 (e.g., a casing string) within the borehole 206 as the borehole tubular 216 is conveyed within the borehole 206.

In at least one embodiment, the centralizer 218 is made up of two sections 300 that are each made up of portions of the collars 232 and one or more rigid spacers or bow springs 234, depending on the type of centralizer 218 used. For bow spring centralizers 218, the sections 300 surround the exterior of the borehole tubular 216 and the inner surface of one of the sections 300 that contact the borehole tubular 216 is coated in the solder particles described above. The portion of the borehole tubular 216 that contacts the sections 300 may also be coated in the solder suspension. The other section 300 is left uncoated and is free to move along the borehole tubular 216 as the bow springs 234 flex. For rigid spacer centralizers 218, both sections 300 are coated since the rigid spacers 218 are not designed to flex and the sections are not intended to move along the borehole tubular 218. The solder suspension may be applied to the sections 300 of the centralizer 218 and/or the borehole tubular 216 at the wellsite or the solder suspension may be applied to the sections 300 and/or the borehole tubular 216 prior to their arrival at the wellsite.

Once aligned as shown in FIG. 3, the sections 300 are pressed against the borehole tubular 218, compressing the solder particles. The compression ruptures the solder particles and the liquid metal solidifies, creating a bond between the sections 300 of the centralizer 218 and the borehole tubular 216. Additionally, the surfaces of each section 300 that contact adjacent sections 300 may also be coated in the solder suspension. Compression of the sections 300 against the borehole tubular 216 compresses the sections 300 together and ruptures the solder particles, creating a bond between the adjacent sections 300 of the centralizer 218 when the released liquid metal solidifies.

Although two sections 300 are shown in FIG. 3, any number of sections may be used to make up the centralizer 218. Additionally, the solder suspension may be applied to the blades of a blade-type centralizer (not shown), which can then be compressed against a borehole tubular 216 to bond the blades to the borehole tubular 216 as described above.

Figure 4:
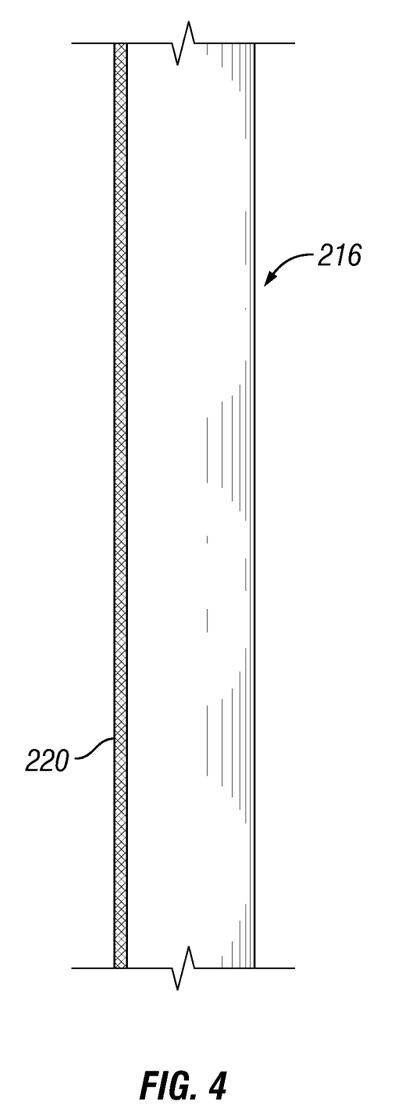
FIG. 4 is a side view of the fiber optic cable of FIG. 2.

Turning now to FIG. 4, FIG. 4 is a side view of the fiber optic cable 220 of FIG. 2. Similar to the centralizer 218, the portion of the surface of the fiber optic cable 220 that contacts the borehole tubular 216 is coated in the solder particles described above. The portion of the borehole tubular 216 that contacts the fiber optic cable 220 may also be coated in the solder suspension. The solder suspension may be applied to the fiber optic cable 220 and/or the borehole tubular 216 at the wellsite or the solder suspension may be applied to the fiber optic cable 220 and/or the borehole tubular 216 prior to their arrival at the wellsite.

Once the fiber optic cable 220 is aligned along the borehole tubular 216 as shown in FIG. 4, the fiber optic cable 220 is pressed against the borehole tubular 216, compressing the solder particles. The compression ruptures the solder particles and the liquid metal in the cores is released and solidifies, creating a bond between the fiber optic cable 220 and the borehole tubular 216. Although FIG. 4 depicts a fiber optic cable 220, the solder solution may also be used to bond a hydraulic control line (not shown) or any other type of tubing or cable to the borehole tubular 216.

Figure 5:
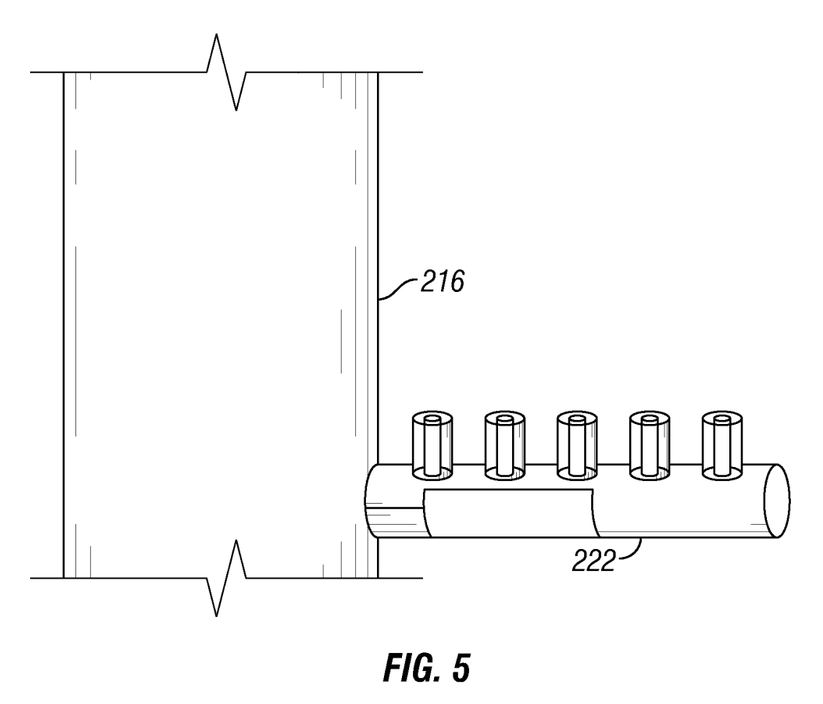
FIG. 5 is a side view of one of the sensors of FIG. 2.

Turning now to FIG. 5, FIG. 5 a side view of one of the sensors 222 of FIG. 2. Similar to the centralizer 218 and the fiber optic cable 220, the surface of the sensor 222 that contacts the borehole tubular 216 is coated in the solder particles described above. The portion of the borehole tubular 216 that contacts the sensor 222 may also be coated in the solder suspension. The solder suspension may be applied to the sensor 222 and/or the borehole tubular 216 at the wellsite or the solder suspension may be applied to the sensor 222 and/or the borehole tubular 216 prior to their arrival at the wellsite.

Once the sensor 222 is positioned on the borehole tubular 216 at the desired location, the sensor 222 is pressed against the borehole tubular 216, compressing the solder particles. The compression ruptures the solder particles and the liquid metal solidifies, creating a bond between the sensor 222 and the borehole tubular 216. Although FIG. 5 depicts a magnetic resonance sensor 222, the solder solution may also be used to bond a pressure sensor, a temperature sensor, or any other type of sensor to the borehole tubular 216. Further, in some embodiments, a portion of the sensor 222 may enter the borehole tubular 216 through a port (not shown) in the borehole tubular. In such embodiments, the solidified cores of the solder particles may act as a seal to prevent fluid from entering the borehole tubular 216 through the port.

Further examples include:

Example 1 is a method for bonding a first downhole tool to a borehole tubular. The method includes applying solder particles, each particle having an outer shell and a core of liquid metal, to at least one of a surface of the first downhole tool or a surface of the borehole tubular. The method also includes rupturing the shells of the solder particles to release the liquid metal cores. The method further includes bonding the first downhole tool to the borehole tubular by allowing the released liquid metal core to solidify.

In Example 2, the embodiments of any preceding paragraph or combination thereof further include wherein the downhole tool includes at least one of a centralizer, a fiber optic cable, a sensor, or a control line.

In Example 3, the embodiments of any preceding paragraph or combination thereof further include wherein bonding the first downhole tool to the borehole tubular includes creating a seal between the first downhole tool and the borehole tubular.

In Example 4, the embodiments of any preceding paragraph or combination thereof further include applying additional solder particles, each having an outer shell and a core of liquid metal, to a surface of a second downhole tool or the surface of the borehole tubular. The method also includes rupturing the shells of the additional solder particles to release the liquid metal. The method further includes bonding the second downhole tool to the borehole tubular by allowing the released liquid metal to solidify.

In Example 5, the embodiments of any preceding paragraph or combination thereof further include bonding the second downhole tool radially spaced apart from the first downhole tool.

In Example 6, the embodiments of any preceding paragraph or combination thereof further include bonding the second downhole tool axially spaced apart from the first downhole tool.

In Example 7, the embodiments of any preceding paragraph or combination thereof further include wherein bonding the second downhole tool to the borehole tubular includes creating a seal between the second downhole tool and the borehole tubular.

In Example 8, the embodiments of any preceding paragraph or combination thereof further include wherein the second downhole tool includes at least one of a centralizer, a fiber optic cable, a sensor, or a control line.

In Example 9, the embodiments of any preceding paragraph or combination thereof further include applying the solder particles to the first downhole tool or the borehole tubular at a wellsite.

In Example 10, the embodiments of any preceding paragraph or combination thereof further include applying the solder particles to the first downhole tool prior to the downhole tool arriving at a wellsite.

In Example 11, the embodiments of any preceding paragraph or combination thereof further include wherein bonding the first downhole tool to the borehole tubular includes bonding the first downhole tool to the borehole tubular at the wellsite.

Example 12 is downhole tool for use on a surface of a borehole tubular within a borehole. The downhole tool includes a surface and solder particles coated on the surface, each comprising an outer shell and a core of liquid metal and being rupturable by contact between the surface and the borehole tubular such that the liquid metal solidifies and bonds the downhole tool to the borehole tubular.

In Example 13, the embodiments of any preceding paragraph or combination thereof further include wherein the solder particles are rupturable such that the core solidifies and seals between the downhole tool and the borehole tubular.

Example 14 is downhole system for use in a borehole. The downhole system includes a borehole tubular comprising a surface and a first downhole tool bonded to the surface via solidified cores of solder particles, the solder particles having an outer shell and a core of liquid metal that solidified upon rupture of the outer shell.

In Example 15, the embodiments of any preceding paragraph or combination thereof further include wherein the first downhole tool includes at least one of a centralizer, a fiber optic cable, a sensor, or a control line.

In Example 16, the embodiments of any preceding paragraph or combination thereof further include wherein the solidified cores of the solder particles seal between the first downhole tool and the borehole tubular.

In Example 17, the embodiments of any preceding paragraph or combination thereof further include a second downhole tool bonded to the borehole tubular via solidified cores from addition solder particles at a location on the borehole tubular that is spaced apart from the first downhole tool, the additional solder particles having an outer shell and a core of liquid metal that solidified upon rupture of the outer shell.

In Example 18, the embodiments of any preceding paragraph or combination thereof further include wherein the second downhole tool is axially spaced apart from the first downhole tool.

In Example 19, the embodiments of any preceding paragraph or combination thereof further include wherein the second downhole tool is radially spaced apart from the first downhole tool.

In Example 20, the embodiments of any preceding paragraph or combination thereof further include wherein the solidified cores from the additional solder particles seal between the second downhole tool and the borehole tubular.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for bonding a first downhole tool to a borehole tubular, the method comprising:
applying solder particles, each particle having an oxidized outer metal shell and a core of liquid metal, to at least one of a surface of the first downhole tool or a surface of the borehole tubular;
rupturing the shells of the solder particles to release the liquid metal cores by at least one of mechanical stress or chemical etching of the oxidized outer metal shell; and
bonding the first downhole tool to the borehole tubular by allowing the released liquid metal core to solidify.

2. The method of claim 1, wherein the downhole tool comprises at least one of a centralizer, a fiber optic cable, a sensor, or a control line.

3. The method of claim 1, wherein bonding the first downhole tool to the borehole tubular comprises creating a seal between the first downhole tool and the borehole tubular by rupturing the shells of the solder particles downhole.

4. The method of claim 1, further comprising:
applying additional solder particles, each having an oxidized outer metal shell and a core of liquid metal, to a surface of a second downhole tool or the surface of the borehole tubular;
rupturing the shells of the additional solder particles to release the liquid metal by at least one of mechanical stress or chemical etching of the oxidized outer metal shell; and
bonding the second downhole tool to the borehole tubular by allowing the released liquid metal to solidify.

5. The method of claim 4, further comprising bonding the second downhole tool radially spaced apart from the first downhole tool.

6. The method of claim 4, further comprising bonding the second downhole tool axially spaced apart from the first downhole tool.

7. The method of claim 4, wherein bonding the second downhole tool to the borehole tubular comprises creating a seal between the second downhole tool and the borehole tubular.

8. The method of claim 4, wherein the second downhole tool comprises at least one of a centralizer, a fiber optic cable, a sensor, or a control line.

9. The method of claim 1, further comprising applying the solder particles to the first downhole tool or the borehole tubular at a wellsite.

10. The method of claim 1, further comprising applying the solder particles to the first downhole tool prior to the downhole tool arriving at a wellsite.

11. The method of claim 10, wherein bonding the first downhole tool to the borehole tubular comprises bonding the first downhole tool to the borehole tubular at the wellsite.

12. A downhole tool for use on a surface of a borehole tubular within a borehole, the downhole tool comprising:
a surface; and
solder particles coated on the surface, each comprising an oxidized outer metal shell and a core of liquid metal and being rupturable by contact between the surface and the borehole tubular by at least one of mechanical stress or chemical etching of the oxidized outer metal shell such that the liquid metal solidifies and bonds the downhole tool to the borehole tubular.

13. The downhole tool of claim 12, wherein the solder particles are rupturable such that the liquid metal solidifies and seals between the downhole tool and the borehole tubular.

14. A downhole system for use in a borehole, the downhole system comprising:
a borehole tubular comprising a surface; and
a first downhole tool bonded to the surface via solidified cores of solder particles, the solder particles having an oxidized outer metal shell and a core of liquid metal that solidified upon rupture of the oxidized outer metal shell, wherein rupturing occurs by at least one of mechanical stress or chemical etching of the oxidized outer metal shell.

15. The downhole system of claim 14, wherein the first downhole tool comprises at least one of a centralizer, a fiber optic cable, a sensor, or a control line.

16. The downhole system of claim 14, wherein the solidified cores of the solder particles seal between the first downhole tool and the borehole tubular.

17. The downhole system of claim 14, further comprising a second downhole tool bonded to the borehole tubular via solidified cores from addition solder particles at a location on the borehole tubular that is spaced apart from the first downhole tool, the additional solder particles having an oxidized outer metal shell and a core of liquid metal that solidified upon rupture of the oxidized outer metal shell.

18. The downhole system of claim 17, wherein the second downhole tool is axially spaced apart from the first downhole tool.

19. The downhole system of claim 17, wherein the second downhole tool is radially spaced apart from the first downhole tool.

20. The downhole system of claim 17, wherein the solidified cores from the additional solder particles seal between the second downhole tool and the borehole tubular.

* * * * *